(12) United States Patent
Yasumoto et al.

(10) Patent No.: US 9,931,918 B2
(45) Date of Patent: Apr. 3, 2018

(54) VEHICLE ROOF STRUCTURE

(71) Applicants: TOYOTA JIDOSHA KABUSHIKI KAISHA, Toyota-shi, Aichi-ken (JP); AISIN SEIKI KABUSHIKI KAISHA, Kariya-shi, Aichi-ken (JP)

(72) Inventors: Ryo Yasumoto, Nagakute (JP); Makoto Muranaka, Nagoya (JP)

(73) Assignees: TOYOTA JIDOSHA KABUSHIKI KAISHA, Toyota (JP); AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/407,868

(22) Filed: Jan. 17, 2017

(65) Prior Publication Data

US 2017/0217291 A1 Aug. 3, 2017

(30) Foreign Application Priority Data

Feb. 1, 2016 (JP) .................................. 2016-017281

(51) Int. Cl.
| | |
|---|---|
| *B60J 7/043* | (2006.01) |
| *B60J 3/00* | (2006.01) |
| *B60J 7/057* | (2006.01) |
| *B60J 7/22* | (2006.01) |

(52) U.S. Cl.
CPC ............... *B60J 7/043* (2013.01); *B60J 3/007* (2013.01); *B60J 7/057* (2013.01); *B60J 7/22* (2013.01)

(58) Field of Classification Search
CPC ................................ B60J 7/22; B60J 7/043

USPC .......................................................... 296/217
See application file for complete search history.

(56) References Cited

U.S. PATENT DOCUMENTS

| | | | | |
|---|---|---|---|---|
| 6,030,031 A | * | 2/2000 | Martinus Lenkens | B60J 7/0046 296/217 |
| 7,641,274 B2 | * | 1/2010 | Boehm | B32B 17/10018 296/211 |
| 7,862,109 B2 | * | 1/2011 | Geerets | B60J 7/0046 296/217 |
| 2001/0019217 A1 | * | 9/2001 | Hertel | B60J 7/0046 296/217 |

(Continued)

FOREIGN PATENT DOCUMENTS

| | | |
|---|---|---|
| JP | H11-240334 A | 9/1999 |
| JP | 2003-191754 A | 7/2003 |
| JP | 5456439 B2 | 3/2014 |

*Primary Examiner* — Dennis H Pedder
(74) *Attorney, Agent, or Firm* — Oliff PLC

(57) ABSTRACT

A vehicle roof structure including roof glass that includes an opaque coating section formed so as to shield a structural object disposed at a vehicle lower side from view from the vehicle cabin outer side, a shielding body, and an extension. The shielding body is provided at the vehicle lower side of the roof glass at a coating width direction inner end of the opaque coating section, includes an upper end on a vehicle upper side attached to the roof glass, and shields a location of the structural object facing the opaque coating section. The extension includes an extension direction leading end positioned further inward with respect to the glass surface than the coating width direction inner end, and shields a location of the structural object jutting out further inward with respect to the glass surface than the shielding body.

3 Claims, 2 Drawing Sheets

(56) References Cited

U.S. PATENT DOCUMENTS

2003/0122406 A1 7/2003 Sugiura
2008/0036247 A1* 2/2008 Park ...................... B60J 7/0046
296/217

* cited by examiner

VEHICLE ROOF STRUCTURE

CROSS-REFERENCE TO RELATED APPLICATION

This application claims priority under 35 USC 119 from Japanese Patent Application No. 2016-017281 filed Feb. 1, 2016, the disclosure of which is incorporated by reference herein.

BACKGROUND

Technical Field

Preferred embodiments relate to a vehicle roof structure.

Related Art

Japanese Patent No. 5456439 describes a sunroof device in which an opening formed in a roof of a vehicle is opened and closed by sliding glass. The sunroof device includes a movement mechanism, serving as a mechanical structural object, having guide rails and sliders. The guide rails are respectively disposed at both vehicle width direction sides of the opening, and the guide rails extend along the vehicle front-rear direction. The sliders are respectively attached to both vehicle width direction sides of the sliding glass and are supported so as to be capable of moving at the guide rails. A glass garnish serving as a shielding body attached to the sliding glass is disposed at an inner side in a vehicle width direction of the mechanical structural object. The glass garnish is formed by an opaque material and shields the mechanical structural object from view from the vehicle cabin outer side.

SUMMARY

In the above sunroof device, a ceramic coating section is formed running along an edge location of the sliding glass at a specific coating width from an end of a glass side face of the sliding glass toward the middle of a glass surface. The ceramic coating section is a region coated by a ceramic material serving as an opaque material, and shields the mechanical structural object from view from the vehicle cabin outside. In consideration of variation in the coating width of the ceramic coating section, variation in the attachment position of the glass garnish the ceramic coating section, and so on, the ceramic coating section is set to a coating width to which a tolerance dimension has been added. The coating width therefore increases, and a countermeasure to address this becomes necessary.

An exemplary embodiment of technology disclosed herein provides a vehicle roof structure that enables a structural object to be shielded from view from a vehicle cabin outside, and that enables a coating width of an opaque coating section of roof glass to be made smaller.

A first aspect of technology disclosed herein is a vehicle roof structure including roof glass that is provided at an opening formed in a roof of a vehicle and has a glass thickness direction in a vehicle vertical direction, and that includes an opaque coating section formed along a glass edge at a specific coating width from an end of a glass side face toward a middle of a glass surface at a vehicle cabin inner side, so as to shield a structural object disposed at a vehicle lower side from view from a vehicle cabin outer side; a shielding body that is provided at a vehicle lower side of the roof glass, at a coating width direction inner end of the opaque coating section, the shielding body including an upper end on a vehicle upper side attached to the roof glass, including a lower end hanging down from the upper end toward the vehicle lower side and positioned above the structural object, and shielding a location of the structural object facing the opaque coating section from view from the vehicle cabin outer side; and an extension that extends out along the glass surface from the upper end of the shielding body at a specific extension width toward the middle of the glass surface, the extension including an extension direction leading end positioned further toward an inner side with respect to the glass surface than the coating width direction inner end, and shielding a location of the structural object jutting out further toward the inner side with respect to the glass surface than the shielding body from view from the vehicle cabin outer side.

The vehicle roof structure includes the roof glass and the shielding body. The roof glass is provided to the opening formed in the roof of the vehicle and has its glass thickness direction in the vehicle vertical direction. The roof glass includes the opaque coating section. The opaque coating section is formed along the glass edge at a specific coating width from the end of the glass side face toward the middle of the glass surface at the vehicle cabin inner side, and shields the structural object disposed at the vehicle lower side from view from the vehicle cabin outer side. The shielding body is provided at the vehicle lower side of the roof glass at the coating width direction inner end of the opaque coating section. The upper end at the vehicle upper side of the shielding body is attached to the roof glass. The shielding body hangs down from the upper end toward the vehicle lower side, and the hanging down lower end thereof is positioned above the structural object. The shielding body shields a location of the structural object facing the opaque coating section from view from the vehicle cabin outer side.

The vehicle roof structure includes the extension. The extension extends from the upper end of the shielding body along the surface at the vehicle cabin inner side of the roof glass at a specific extension width toward the middle of the glass surface, and includes the extension direction leading end positioned further toward the middle of the glass surface than the coating width direction inner end. The extension shields a location of the structural object jutting out further toward the middle of the glass surface than the shielding body from view from the vehicle cabin outer side. Accordingly, a shielding region, from the coating width direction inner end of the opaque coating section toward the middle of the glass surface of the roof glass where the jutting-out location of the structural object is shielded from view, can be widened by using the extension in addition to the coating width of the opaque coating section.

An exemplary embodiment of technology disclosed herein has an advantageous effect of enabling a structural object to be shielded from view from a vehicle cabin outer side, and enabling a coating width of an opaque coating section of roof glass to be made smaller.

BRIEF DESCRIPTION OF THE DRAWINGS

Exemplary embodiments of the present disclosure will be described in detail based on the following figures, wherein.

DETAILED DESCRIPTION

Figure 1:
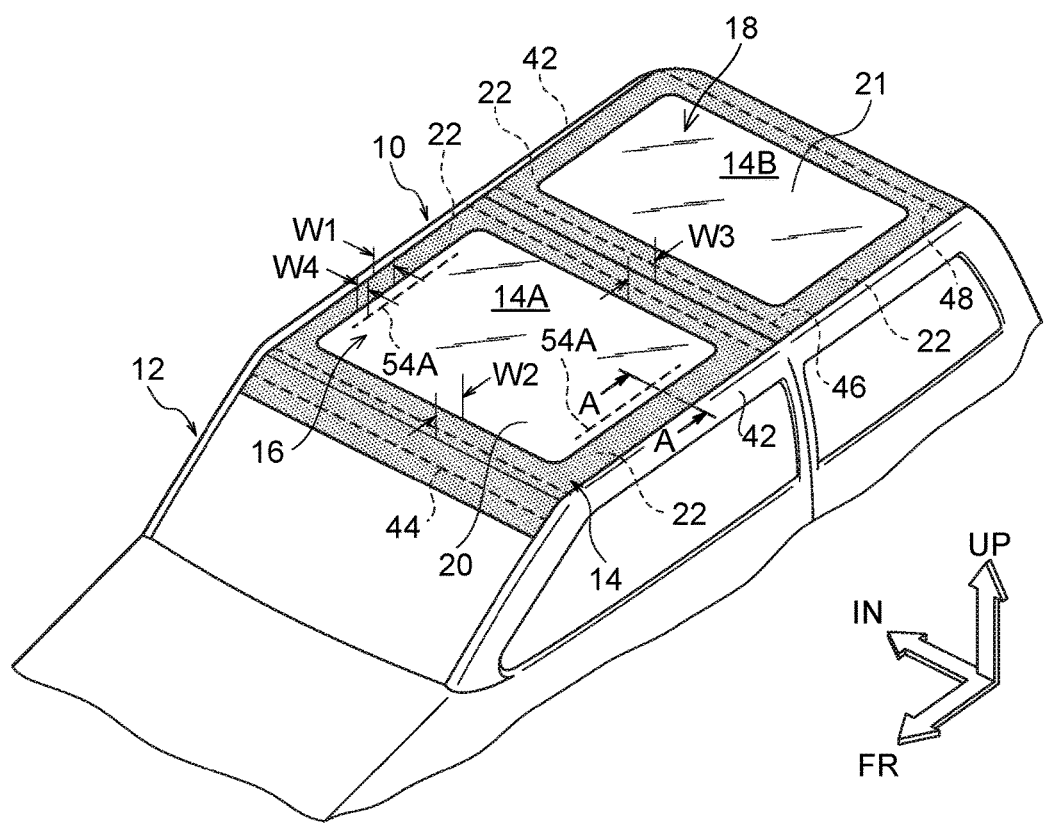
FIG. 1 is a perspective view of relevant portions of a roof section of a vehicle applied with a vehicle roof structure according to an exemplary embodiment, as viewed from a vehicle front side.
Figure 2:
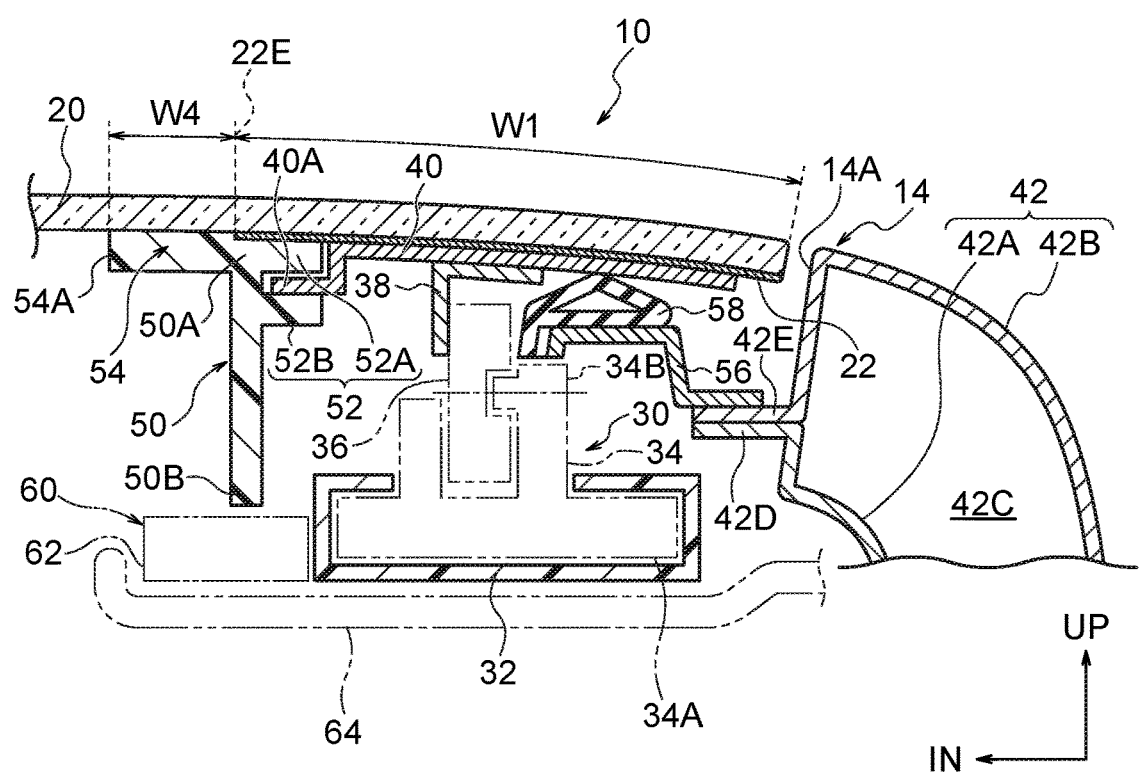
FIG. 2 is a cross-section of the vehicle roof structure illustrated in FIG. 1, as viewed from the vehicle front side (a cross-section taken along line A-A in FIG. 1).

Explanation follows regarding a vehicle roof structure according to technology disclosed herein, with reference to FIG. 1 and FIG. 2. In the drawings, the arrow FR indicates the vehicle front direction, and the arrow IN indicates the vehicle width direction inner side as appropriate. The arrow UP indicates the vehicle up direction.

Configuration of Vehicle Roof Structure

In the example illustrated in FIG. 1, a vehicle roof structure 10 according to the present exemplary embodiment is applied to a roof 14 having a panoramic roof structure of a vehicle 12. To explain in detail, the panoramic roof structure includes a movable (sliding) sunroof 16 provided at a vehicle front side of the roof 14, and a fixed sunroof 18 provided at a vehicle rear side of the roof 14. The panoramic roof structure is configured with substantially the entire region of the roof 14 serving as a sunroof. The vehicle roof structure 10 according to the present exemplary embodiment is applied to the movable sunroof 16.

The vehicle roof structure 10 of the movable sunroof 16 includes roof glass 20 that opens and closes a rectangular shaped opening (sunroof opening) 14A formed in the roof 14, as viewed in vehicle plan view. The periphery of the opening 14A is formed enclosed by a pair of roof side rails 42 respectively provided at both vehicle width direction sides, a front header 44, and roof reinforcement 46. The pair of roof side rails 42 respectively extend with their length direction along the vehicle front-rear direction. The front header 44 extends with its length direction along the vehicle width direction and spans between respective vehicle front ends of the pair of roof side rails 42. The roof reinforcement 46 extends with its length direction along the vehicle width direction and spans between respective vehicle front-rear direction intermediate portions of the pair of roof side rails 42.

The roof glass 20 is provided with its glass thickness direction in the vehicle vertical direction, and is a panel made of glass formed in a rectangular shape as viewed in vehicle plan view. The roof glass 20 is also referred to as sliding roof glass. As illustrated in the example in FIG. 1 and FIG. 2, an opaque coating section 22 is provided to the roof glass 20 at the glass surface on the vehicle lower side (vehicle cabin inside). The opaque coating section 22 is formed along the vehicle front-rear direction along glass edges of the roof glass 20 at a specific coating width W1 toward a middle of the glass surface from the ends of the vehicle width direction glass side faces. FIG. 2 illustrates the structure at a right side upper portion of the vehicle 12, as viewed from the front of the vehicle. The vehicle 12 has a left-right symmetrical structure, and so explanation of the structure at the left side upper portion of the vehicle 12 is omitted here.

As illustrated in the example in FIG. 1, the opaque coating section 22 is also provided running along the vehicle width direction along glass edges, at a coating width W2 toward the middle of the glass surface from an end of the glass side face at the vehicle front side toward the vehicle rear side, and at a coating width W3 toward the middle of the glass surface from an end of the glass side face at the vehicle rear side toward the vehicle front side. Namely, in the present exemplary embodiment, the opaque coating section 22 is provided around all the glass edges of the roof glass 20. The opaque coating section 22 is formed, for example, by coating a ceramic material with light-shielding properties that shields from view structural objects and the like disposed to the vehicle lower side of the roof glass 20 and the opaque coating section 22, namely, disposed at the vehicle cabin inside, to an extent that they are not conspicuous when viewed from the vehicle cabin outside. Moreover, the opaque coating section 22 formed by the ceramic material enables adhesion when adhering components using an adhesive to be improved in comparison to a film material made of resin.

Returning to FIG. 2, a movement mechanism 30 capable of moving the roof glass 20 in the vehicle front-rear direction is provided along the vehicle width direction at a vehicle lower side of the opaque coating section 22 of the roof glass 20. The movement mechanism 30 is a structural object (a location of the structural object facing the opaque coating section 22) shielded from view from the vehicle cabin outside. The movement mechanism 30 is configured including a guide rail 32, a slider 34, a stay 36, a bracket 38, and an attachment panel 40. Note that the movement mechanism 30 is an example of a structural object and a first movement mechanism of technology disclosed herein.

The guide rail 32 has a rail width set to within the range of the coating width W1 of the opaque coating section 22. The guide rail 32 extends along the vehicle width direction inner side of a roof side rail 42 and has its length direction along the vehicle front-rear direction. The guide rail 32 has a C-shaped cross-section structure open toward the vehicle upper side as viewed from the vehicle front. The roof side rail 42 includes an inner panel 42A, and an outer panel 42B that is disposed at the vehicle width direction outer side of the inner panel 42A and that, together with the inner panel 42A, forms a space 42C which has a closed cross-section structure. An upper end of the inner panel 42A includes a flange 42D that extends out toward the vehicle width direction inner side, and an upper end of the outer panel 42B includes a flange 42E that extends out toward the vehicle width direction inner side, similarly to the flange 42D. The flange 42E overlaps the flange 42D in vehicle plan view, and is joined thereto through a join portion formed by spot welding or arc welding.

Returning to the movement mechanism 30, a lower end 34A of the slider 34 is supported so as to be capable of moving along the guide rail 32. An upper end 34B of the slider 34 is attached to the surface of the opaque coating section 22 of the roof glass 20 through the stay 36, the bracket 38, and the attachment panel 40. The attachment panel 40 is adhered to the opaque coating section 22 using an adhesive.

Although detailed explanation is omitted, a movement mechanism 60 that is adjacent to the movement mechanism 30 and that includes an electric sunshade guide rail 62 is provided further inward in the vehicle width direction than the movement mechanism 30. The movement mechanism 60 is a movement mechanism serving a different purpose to that of the movement mechanism 30, and similarly to the movement mechanism 30, is a structural object (a jutting-out location of the structural object) shielded from view from the vehicle cabin outer side. Note that the movement mechanism 60 is an example of a structural object and a second movement mechanism of technology disclosed herein.

A ceiling trim 64 spread along the vehicle width direction with its length direction in the vehicle front-rear direction is disposed at the vehicle lower side of the movement mechanism 30 and the movement mechanism 60. The ceiling trim 64 is employed as a vehicle cabin interior design face, and is configured shielding the movement mechanism 30 and the movement mechanism 60 from view from the vehicle cabin inner side.

A glass garnish 50 is provided at the vehicle cabin inner side glass surface of the roof glass 20, and serves as a shielding body below an inner end 22E in the coating width W1 direction (vehicle width direction) of the opaque coating section 22. Namely, the glass garnish 50 is an example of a shielding body according to technology disclosed herein. The glass garnish 50 extends along the length direction of the guide rail 32. A holder 52 is provided at a vehicle width direction outer side of an upper end 50A at the vehicle upper side of the glass garnish 50. The holder 52 includes an upper extension location 52A that runs from the upper end 50A along the surface of the opaque coating section 22 and that extends out toward the vehicle width direction outer side, and a lower extension location 52B that runs alongside the upper side extension location 52A from slightly further to the vehicle lower side than the upper end 50A and that extends out parallel to the upper side extension location 52A. The upper extension location 52A and the lower extension location 52B of the holder 52 are configured so as to hold a held portion 40A that projects out from the attachment panel 40 toward the vehicle width direction inner side. The held portion 40A is configured by first bending a vehicle width direction inner side location of the attachment panel 40 toward the vehicle lower side, and then bending back a vehicle lower end of this bent portion toward the vehicle width direction inner side. Upon holding the held portion 40A using the holder 52, the upper end 50A of the glass garnish 50 is attached to the attachment panel 40.

A vehicle lower side of the glass garnish 50 hangs down toward the vehicle lower side alongside the vehicle width direction inner side of the movement mechanism 30. A lower end 50B at the vehicle lower side of the glass garnish 50 is configured above the movement mechanism 60, positioned so as to have a slight gap to the movement mechanism 60. The glass garnish 50 is configured at least with a surface layer made of an opaque resin, and is configured such that the movement mechanism 30 that faces the opaque coating section 22 in the vehicle vertical direction is shielded from view from the vehicle cabin outer side.

At the vehicle width direction outer side of the glass garnish 50, a bracket 56 having a trapezoidal shape as viewed from the vehicle front is joined to the flange 42E of the roof side rail 42. A weather strip 58 made of rubber and having its length direction in the vehicle front-rear direction is provided between the bracket 56 and the opaque coating section 22 of the roof glass 20. Configuration is made such that when the opening 14A is closed off, the weather strip 58 improves the airtightness between the roof glass 20 and the roof side rail 42, and prevents water and sound from the vehicle cabin outer side from intruding into the vehicle cabin inner side.

As illustrated in the example in FIG. 2, the glass garnish 50 of the vehicle roof structure 10 configured in this manner includes an extension 54. To explain in detail, the extension 54 extends out from the upper end 50A at the vehicle upper side of the glass garnish 50 toward the vehicle width direction inner side, this being the opposite direction to the extension direction of the holder 52. The extension 54 extends out along the vehicle cabin inner side glass surface of the roof glass 20. Although not illustrated in the vehicle front-rear direction, the extension 54 extends with its length direction along the vehicle front-rear direction, similarly to the glass garnish 50. An extension direction leading end 54A of the extension 54, namely, vehicle width direction innermost end of the extension 54, is positioned further inward in the vehicle width direction than the inner end 22E of the opaque coating section 22. Moreover, the extension direction leading end 54A is set at a position further inward in the vehicle width direction than the vehicle width direction inner end of the movement mechanism 60 which juts out further inward in the vehicle width direction than both the coating width W1 direction inner end 22E of the opaque coating section 22 and the glass garnish 50. An extension width W4 of the extension 54 is configured with a specific width dimension from the inner end 22E of the opaque coating section 22, or from the vehicle width direction inner side surface of the glass garnish 50, to the extension direction leading end 54A.

Similarly to the glass garnish 50, the extension 54 is configured by at least an opaque surface layer of, for example, a resin material. Note that when used here, the meaning of at least a surface layer of an opaque material includes both composite materials configured by bonding an opaque material to the surface of a transparent material, and materials that are entirely opaque. In the present exemplary embodiment, the extension 54 is integrally formed to the glass garnish 50 using a resin molding method. The extension 54 is abutted against the glass surface on the vehicle cabin inner side of the roof glass 20, and extends out contiguously from the opaque coating section 22 toward the vehicle width direction inner side.

Note that the vehicle roof structure 10 according to the present exemplary embodiment is applied to both vehicle width direction ends of the movable sunroof 16, and may be applied to either one or both of the vehicle front section and the vehicle rear section of the movable sunroof 16. To explain in detail, as illustrated in the example in FIG. 1, the opaque coating section 22 is provided to the movable sunroof 16 at the coating width W2 at the vehicle front side of the roof glass 20 and at the coating width W3 at the vehicle rear side of the roof glass 20. Although not illustrated in the drawings, a glass garnish may be provided below the coating width W2 direction inner end 22E of the opaque coating section 22, and an extension extending out toward the vehicle rear side may be provided at an upper end of this glass garnish. This extension may be configured such that, for example, the front header 44 serving as a structural object disposed below the opaque coating section 22, is shielded from view from the vehicle cabin outer side. Similarly, a glass garnish may be provided below the coating width W3 direction inner end 22E of the opaque coating section 22, and an extension extending out toward the vehicle front side may be provided at an upper end of this glass garnish. This extension may be configured such that, for example, the roof reinforcement 46 serving as a structural object disposed below the opaque coating section 22 is shielded from view from the vehicle cabin outer side.

As illustrated in the example in FIG. 1, the fixed sunroof 18 includes roof glass 21 that covers an opening (sunroof opening) 14B that is formed to the roof 14 and that has a rectangular shape in vehicle plan view. The periphery of the opening 14B is formed enclosed by the pair of roof side rails 42, a rear header 48, and the roof reinforcement 46. The rear header 48 extends with its length direction in the vehicle width direction and spans between the vehicle rear ends of the pair of roof side rails 42.

Similarly to the roof glass 20 described above, the opaque coating section 22 is also provided to the roof glass 21. In the fixed sunroof 18, although not illustrated in the drawings, a sunshade and a movement mechanism (not illustrated in the drawings) capable of moving the sunshade are provided at the vehicle cabin inner side of the roof glass 21. In the present exemplary embodiment, the coating width of the opaque coating section 22 of the roof glass 21 is set smaller than the coating width W1 and so on of the roof glass 20. The vehicle roof structure 10 is therefore not applied to the fixed sunroof 18. However, were there to be demand to reduce the coating width of the opaque coating section 22, the vehicle roof structure 10 could be applied to the fixed sunroof 18, and extensions could be provided to glass garnishes disposed at the vehicle width direction inner side of the sunshade movement mechanism.

Operation and Advantageous Effects of Present Exemplary Embodiment

As explained above, the vehicle roof structure 10 according to the present exemplary embodiment includes the roof glass 20 and the glass garnish 50, as illustrated in the example in FIG. 2. The roof glass 20 is provided at the opening 14A formed in the roof 14 of the vehicle 12 and has its glass thickness direction in the vehicle vertical direction. The roof glass 20 includes the opaque coating section 22. The opaque coating section 22 is formed running along the respective vehicle front-rear direction glass edges at the coating width W1 toward the middle of the glass surface from the end of each glass side face. The opaque coating section 22 is configured such that the movement mechanism 30 mainly disposed at the vehicle lower side thereof is shielded from view from the vehicle cabin outer side. More specifically, the opaque coating section 22 shields the movement mechanism 30 from view from the vehicle cabin outer side, within a field of vision looking down on the vehicle lower side from a vehicle upper side. The glass garnish 50 is provided at the coating width W1 direction inner end 22E of the opaque coating section 22 of the roof glass 20, at the vehicle lower side of the roof glass 20. The upper end 50A at the vehicle upper side of the glass garnish 50 is attached to the roof glass 20. The vehicle lower side of the glass garnish 50 hangs down from the upper end 50A alongside the vehicle width direction inner side of the movement mechanism 30. The downward hanging lower end 50B is positioned above the movement mechanism 60. The glass garnish 50 mainly shields the movement mechanism 30 from view from the vehicle cabin outer side, and also shields part of the movement mechanism 60 from view from the vehicle cabin outer side.

Note that the vehicle roof structure 10 includes the extension 54. The extension 54 runs along the glass surface at the vehicle cabin inner side of the roof glass 20 and extends out from the upper end 50A of the glass garnish 50 toward the vehicle width direction inner side by the extension width W4. The extension direction leading end 54A of the extension 54 is positioned further inward in the vehicle width direction than the inner end 22E of the opaque coating section 22. The extension 54 is configured such that the movement mechanism 60 that juts out further toward the vehicle width direction inner side than the glass garnish 50 is shielded from view from the vehicle cabin outer side. More specifically, the location of the movement mechanism 60 that juts out further inward in the vehicle width direction than the glass garnish 50 is shielded from view from the vehicle cabin outer side by the extension 54, within a field of vision looking down on the vehicle lower side from the vehicle upper side. Accordingly, by adding the extension 54 to the coating width W1 of the opaque coating section 22 of the roof glass 20 and the glass garnish 50, a shielding region which shields the movement mechanism 60 from view can be further widened from the inner end 22E of the opaque coating section 22 toward the vehicle width direction inner side. Note that the extension width W4 is set to a specific width dimension to shield the movement mechanism 60 from view from the vehicle outer side, which is determined as appropriate according to the design of the vehicle 12, the height of the vehicle 12, the height of the movement mechanism 60 in the vehicle vertical direction, and the hang-down length of the glass garnish 50.

In the vehicle roof structure 10, the movement mechanism 60 can accordingly be shielded so as not to be visible from the vehicle cabin outer side by the extension 54, and the coating width W1 of the opaque coating section 22 can accordingly be made smaller by an amount corresponding to the extension width W4 of the extension 54. Accordingly, the vehicle roof structure 10 can shield the movement mechanism 60 from view from the vehicle cabin outer side using the extension 54, and the coating width W1 of the opaque coating section 22 can be made smaller by an amount corresponding to the extension width W4 of the extension 54. When the coating width W1 of the opaque coating section 22 becomes smaller, the risk of cracks developing in the roof glass 20, for example, can be reduced.

Moreover, in the vehicle roof structure 10 according to the present exemplary embodiment, the position of the extension direction leading end 54A of the extension 54 is set further inward in the vehicle width direction than the movement mechanism 60. The view-shielding performance of the extension 54 on the movement mechanism 60 can thus be improved.

In the vehicle roof structure 10 according to the present exemplary embodiment, the extension 54 is provided so as to abut the vehicle cabin inner side surface of the roof glass 20. Thus, as viewed from the vehicle cabin outer side, the extension 54 can appear as being integrated together with the opaque coating section 22, such that the boundary line between the extension 54 and the opaque coating section 22 becomes less distinct, enabling the design quality to be improved.

Moreover, in the vehicle roof structure 10 according to the present exemplary embodiment, the extension 54 is integrally formed to the glass garnish 50. The coating width W1 of the opaque coating section 22 can thereby by made smaller without increasing the number of components and without complicating the structure.

Supplementary Explanation of Above Exemplary Embodiment

The technology disclosed herein is not limited to the above exemplary embodiment, and various modifications are possible within a scope not departing from the spirit of the technology disclosed herein. For example, the technology disclosed herein may be configured such that an opaque coating section of the roof glass is formed by a metal member having view-shielding properties instead of the ceramic material. Moreover, the technology disclosed herein is not limited to a panoramic roof structure, and may be broadly applied to general sunroof structures which include roof glass having an opaque coating section.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A vehicle roof structure comprising:
    roof glass that is provided at an opening formed in a roof of a vehicle and has a glass thickness direction in a vehicle vertical direction, and that includes an opaque coating section formed along a glass edge at a specific coating width from an end of a glass side face toward a middle of a glass surface, the opaque coating section being formed at a bottom of the roof glass in the vehicle vertical direction, so as to shield a structural object disposed lower than the roof glass in the vehicle vertical direction from view from outside of the vehicle;
a shielding body that is provided lower than the roof glass in the vehicle vertical direction and at an end of the opaque coating section that is opposite the glass edge, the shielding body including an upper end attached to the roof glass and a lower end, the shielding body hanging down in the vehicle vertical direction from a terminus of the upper end to a lower end positioned above the structural object in the vehicle vertical direction, and shielding a location of the structural object facing the opaque coating section from view from outside of the vehicle; and
an extension that extends out along the glass surface from the upper end of the shielding body at a specific extension width toward the middle of the glass surface, the extension including a leading end positioned further toward the middle of the glass surface than the end of the opaque coating section that is opposite the glass edge, and shielding a location of the structural object from view from outside of the vehicle, the structural object jutting out further toward the middle of the glass surface than the lower end of the shielding body.

2. The vehicle roof structure of claim 1, wherein the extension is provided abutting the glass surface at the end of the opaque coating section that is opposite the glass edge so as to appear to be integrated together with the opaque coating section.

3. The vehicle roof structure of claim 1, wherein:
the structural object is generally split into a first movement mechanism and a second movement mechanism, the first movement mechanism being provided lower than the opaque coating section in the vehicle vertical direction, the first movement mechanism being capable of moving the roof glass in a vehicle front-rear direction, the second movement mechanism being adjacent to the first movement mechanism at a position closer to a middle of the vehicle in a vehicle width direction than the first movement mechanism, and the second movement mechanism serving a different purpose from that of the first movement mechanism;
the opaque coating section and the shielding body shield the first movement mechanism from view from outside of the vehicle; and
the opaque coating section, the shielding body, and the extension shield the second movement mechanism from view from outside of the vehicle.

* * * * *